US009969336B2

(12) United States Patent
Dry et al.

(10) Patent No.: US 9,969,336 B2
(45) Date of Patent: May 15, 2018

(54) FLEXIBLE SINGLE PIECE SLIDING DOOR

(71) Applicant: Ford Global Technologies, LLC, Dearborn, MI (US)

(72) Inventors: Alan George Dry, Grosse Pointe Woods, MI (US); Joseph S. Talamonti, Canton, MI (US); Gunnar Groesbeck, Traverse City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 15/214,558

(22) Filed: Jul. 20, 2016

(65) Prior Publication Data

US 2016/0325694 A1    Nov. 10, 2016

Related U.S. Application Data

(62) Division of application No. 14/518,252, filed on Oct. 20, 2014, now Pat. No. 9,421,914.

(51) Int. Cl.
*B60R 11/02* (2006.01)
*B60R 7/04* (2006.01)
*B60R 11/00* (2006.01)

(52) U.S. Cl.
CPC .............. *B60R 11/02* (2013.01); *B60R 7/043* (2013.01); *B60R 2011/0003* (2013.01); *B60R 2011/0015* (2013.01); *B60R 2011/0017* (2013.01); *B60R 2011/0094* (2013.01); *B60R 2011/0276* (2013.01)

(58) Field of Classification Search
CPC . B60R 2011/0003; B60R 11/02; B60R 7/043; B60R 2011/0094; B60R 2011/0276; B60R 2011/0012; B60R 2011/0015; B60R 2011/0017

USPC ........................................................ 296/146.1
See application file for complete search history.

(56) References Cited

U.S. PATENT DOCUMENTS

| 228,627 A | * | 6/1880 | Gordon ................... A47F 3/005 |
| | | | 206/816 |
| 3,088,771 A | | 5/1963 | Weigle |
| 3,460,878 A | | 8/1969 | Peterson et al. |
| 3,806,183 A | | 4/1974 | Sieren et al. |
| 3,814,493 A | * | 6/1974 | Radke ..................... E06B 9/115 |
| | | | 160/201 |
| 4,947,937 A | * | 8/1990 | Searer ....................... E06B 9/62 |
| | | | 160/133 |
| 5,628,543 A | | 5/1997 | Filipovich et al. |
| 5,813,715 A | | 9/1998 | Musukula et al. |
| 7,475,954 B1 | | 1/2009 | Latunski |

(Continued)

FOREIGN PATENT DOCUMENTS

| DE | 102008013574 A1 | 9/2009 |
| EP | 1787856 A1 | 5/2007 |
| WO | 2014012021 A1 | 1/2014 |

*Primary Examiner* — Milton Nelson, Jr.
(74) *Attorney, Agent, or Firm* — Vichit Chea; Price Heneveld LLP (57) ABSTRACT

A door assembly for a vehicle interior opening includes a track extending in an imperfect arc and a door supported by the track and slidable therealong through the imperfect arc. The door comprises a single piece, flexible body, having a plurality of crests defining generally planar surfaces extending parallel to each other in a lateral direction. The crests are joined together by respective ones of a plurality of troughs coupled therebetween.

19 Claims, 5 Drawing Sheets

(56) References Cited

U.S. PATENT DOCUMENTS

2014/0132040 A1 5/2014 Arakawa et al.
2015/0151656 A1* 6/2015 Bozio ................. B60N 2/4646
 296/24.34

* cited by examiner

FLEXIBLE SINGLE PIECE SLIDING DOOR

CROSS REFERENCE TO RELATED APPLICATION

This patent application is a divisional of U.S. patent application Ser. No. 14/518,252, filed on Oct. 20, 2014, entitled "FLEXIBLE SINGLE PIECE SLIDING DOOR", now U.S. Pat. No. 9,421,914, the entire contents of which is hereby incorporated by reference in its entirety.

FIELD OF THE INVENTION

The present invention generally relates to a sliding door for a compartment within a motor vehicle. In particular, the sliding door can travel along an imperfect arc and can be used in a compartment positioned in a vehicle seatback.

BACKGROUND OF THE INVENTION

Motor vehicle interiors typically include a number of compartments, accessible to the occupants of the vehicle. Such compartments may include a door to allow a vehicle occupant to selectively open and close the compartment to permit access to the contents or conceal and secure the contents thereof. Various existing doors may require complicated movement mechanisms, expensive parts requiring time-consuming manufacturing methods, or combinations thereof. Further, certain types of existing doors may require significant space for mounting and to accommodate necessary travel thereof during opening and closing. Such space requirements may make the use of such doors difficult in connection with relatively shallow compartments, for use in concealing various other interior features of the associated vehicle, or in certain locations within a vehicle interior. Accordingly further advances may be desired.

SUMMARY OF THE INVENTION

According to one aspect of the present invention, a vehicle seat includes a seatback having an opening defined along a portion thereof. A track is coupled with the seatback adjacent the opening and extends in an imperfect arc. A door comprising a single piece, flexible body is supported by the track and is slidable between an open position and a closed position relative to the opening. The door is moveable through the imperfect arc by flexing of the body.

According to another aspect of the present invention, a vehicle seat includes a seatback having a mounting unit recessed in a surface thereof, the mounting unit including a mounting receptacle therein. A track is coupled with the seatback adjacent the mounting unit and extends in an imperfect arc. A door is supported by the track and is slidable therealong between a first position in which the door covers the mounting unit and a second position where the mounting unit is uncovered by the door.

According to another aspect of the present invention, a door assembly for a vehicle interior opening includes a track extending in an imperfect arc and a door supported by the track and slidable therealong through the imperfect arc. The door comprises a single piece, flexible body, having a plurality of crests defining generally planar surfaces extending parallel to each other in a lateral direction. The crests are joined together by respective ones of a plurality of troughs coupled therebetween.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
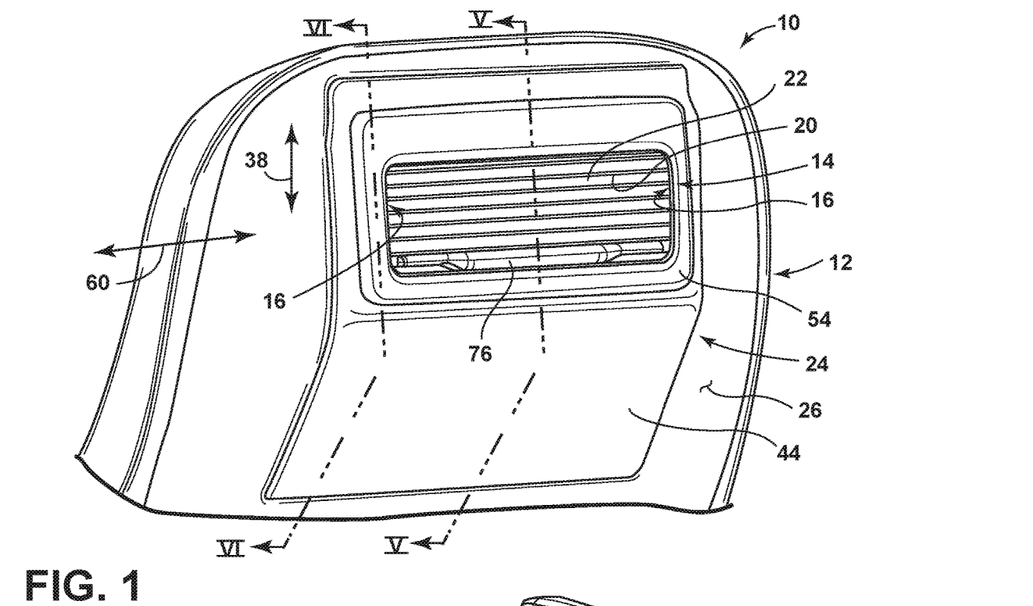
FIG. 1 is a partial, rear-perspective view of a vehicle seatback including a flexible sliding door.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 3:
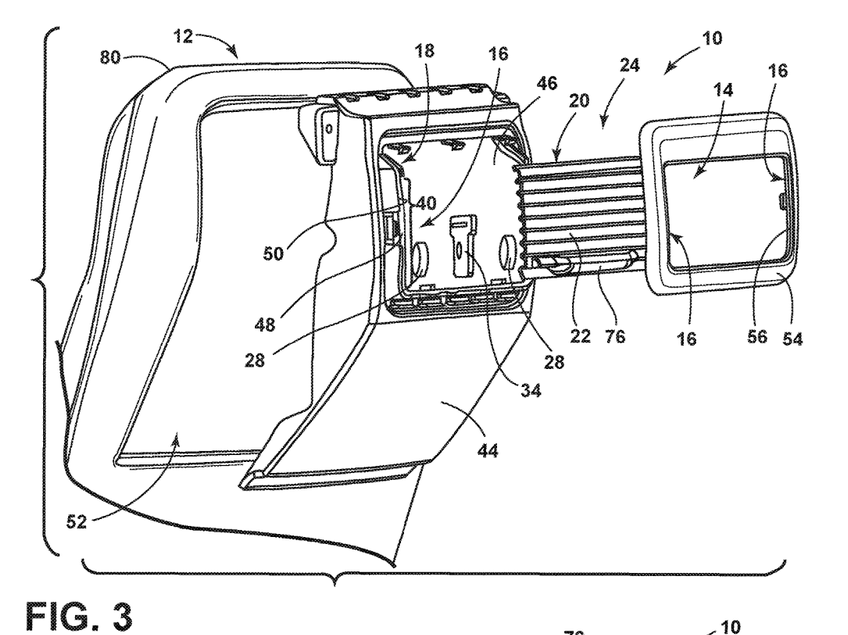
FIG. 3 is an exploded view of the vehicle seatback of FIG. 1.

Referring to FIG. 1, reference numeral 10 generally designates a vehicle seat. Vehicle seat 10 includes a seatback 12 having an opening 14 defined along a portion thereof. A track 16 is coupled with the seatback 12 adjacent the opening 14 and extends in an imperfect arc (such as within arc portion 18 thereof, as illustrated in FIG. 3). A door 20 comprising a single piece, flexible body 22 is supported by the track 16 and is slidable between an open position (FIG. 4) and a closed position relative to the opening 14, as shown in FIG. 1. The door 20 is moveable through the imperfect arc by flexing of body 22.

Figure 2:
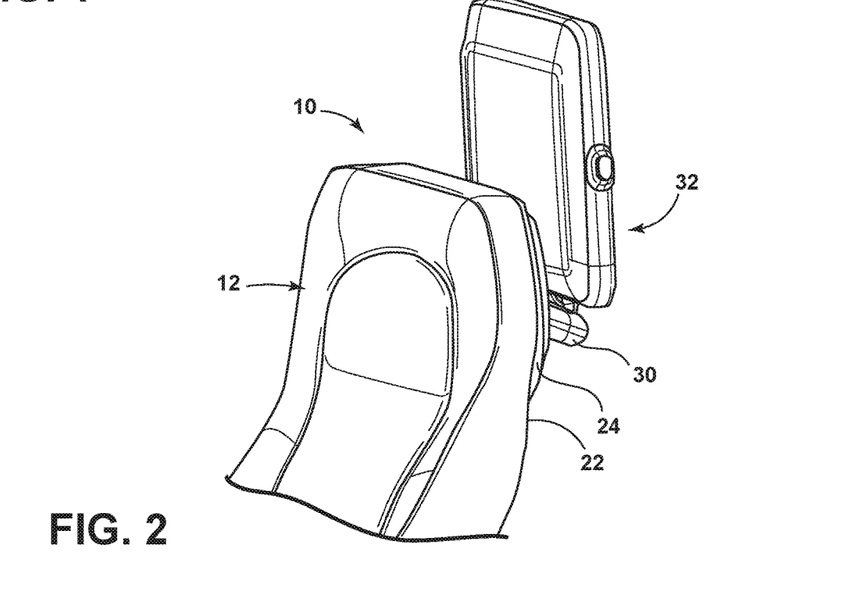
FIG. 2 is a partial, front perspective view of a vehicle seatback having an accessory removably mounted with the seatback of FIG. 1.
Figure 4:
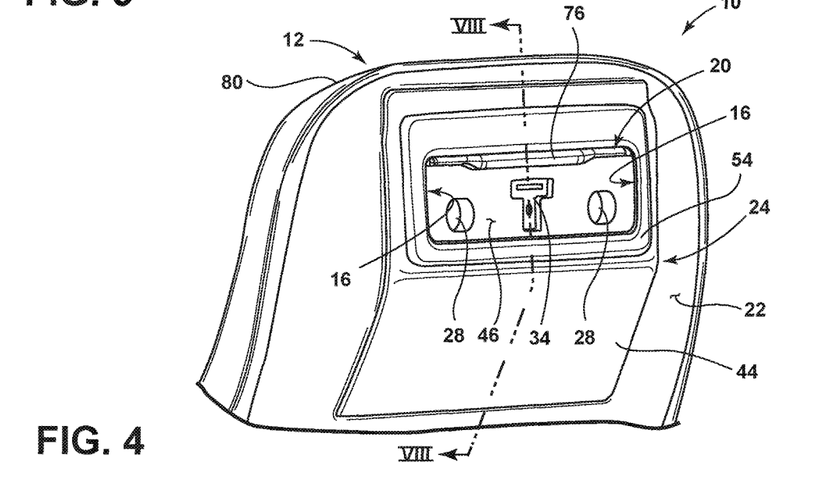
FIG. 4 is a partial, rear perspective view of the vehicle seatback of FIG. 1 with the flexible sliding door in an open state.

As shown in FIGS. 1-4, the above-described track 16 and associated door 20 can be incorporated into a vehicle seat 10 in which seatback 12 includes a mounting unit 24 recessed in a surface, such as a rear surface 26 thereof. As shown in FIG. 4, mounting unit 24 can include at least one mounting receptacle 28 therein, two of such mounting receptacles 28 being included in the example of mounting unit 24 shown in the Figures. Mounting receptacles 28 can be configured to receive corresponding portions of a mounting structure 30 that can be included on a removable accessory 32, as shown in FIG. 2. In the example shown in FIG. 2, removable accessory 32 can be in the form of a display for a rear entertainment system for use in the vehicle associated with seat 10, such as by a passenger in a seat position behind seat 10. The removable accessory 32 in the form of a rear seat display can further include various controls for the entertainment system in the vehicle associated with seat 10, as well as speakers or the like. In general, such an accessory 32 can be made removable from seat 10 by structuring mounting structure 30 thereof to be removably coupleable with mounting receptacle 28 of mounting unit 24, shown in FIG. 4. Further, mounting unit 24 can include electronic couplings 34, such as a power supply for accessory 32, and video, audio, or control links associated therewith. Further, accessory 32, as well as mounting structure 30 can generally obscure otherwise visible portions of mounting unit 24, including mounting receptacle 28 and couplings 34 are view when accessory 32 is assembled with seatback 12. When accessory 32 is not coupled with seatback 12, however, mounting unit 24 and the aforementioned features thereof may be visible to an occupant of the associated vehicle, which may be undesirable. Accordingly, mounting unit 24 can be incorporated with seatback 12 such that at least the portion thereof that includes mounting receptacles 28 and/or couplings 34 is positioned at least partially within opening 14 on seatback 12, and further such that door 20 is in a position to alternately cover or conceal such portions of mounting unit 24 (such as when in the closed positioned as shown in FIG. 1) and expose mounting unit 24 to make it available for attachment with accessory 32 (such as when in the open position shown in FIG. 4).

As shown in FIG. 3, seatback can include a pair of tracks 16, each of which is positioned on a respective, opposite lateral side of opening 14. Each of the tracks 16 can extend in a primarily vertical direction 38 such that door 20 is moveable between the open position and the closed position in a generally up and down direction. As further illustrated, door 20 can be fully supported, including in the open and closed positions, by tracks 16 which can further guide door 20 through movement along the imperfect arc, described further below, during movement from the closed position to the open position and vice versa. As illustrated in FIGS. 3 and 4, tracks 16 can each include respective generally straight portions 40 and the aforementioned arced portions 18. As illustrated, the generally straight portions 40 may be positioned along lateral edges of opening 14 such that door 20 can take on a generally planar configuration to match a similar, generally planar profile of opening 14 when door 20 is in the closed position. The generally straight portions 40 of tracks 16 can transition into the arc portions 18 thereof such that door 20 can bend and flex during, for example, movement from the closed position to the open position, which may permit more spatially-efficient stowing of door 20 within portions of seatback 12 adjacent opening 14, as discussed further below.

As particularly illustrated in the exploded view of FIG. 3, mounting unit 24 can be configured such that door 20 can be slidably coupled therewith. Such slidable coupling can be achieved by incorporating tracks 16 into various components of mounting unit 24. As shown, such incorporation can include the incorporation of receptive first portions 42 of tracks 16 in a face plate 44 that is a part of mounting unit 24. As shown, face plate 44 can include openings to both mounting receptacles 28 and electronic couplings 34 on a surface 46 thereof. First portions 42 of tracks 16 can be positioned laterally adjacent to surface 46 such that door 20 is moveable thereover. Face plate 44 can further serve as a mounting component for internal components of mounting unit 24, such as those that may be associated with mounting receptacles 28 and electronic couplings 34. In general, first portions 42 of tracks 16 can include respective surfaces 48 that are positioned adjacent surface 46 and can further and optionally be spaced above surface 46 such that door 20 does not interfere with surface 46 or any of the features thereon. First portions 42 of tracks 16 can further include respective edge guides 50 spaced laterally of respective surfaces 48 to help maintain door 20 in contact with surfaces 48 by prevention of lateral movement of door 20 and/or rotation of door 20 with respect to opening 14. As illustrated, face plate 44 can be assembled within a recess 52 in seatback 12.

As further shown in FIG. 3, mounting unit 24 can include a bezel 54 that can be coupled with face plate 44 in the area of surface 46. Bezel 54 can define opening 14 therein such that when bezel 54 is assembled with face plate 44, opening 14 is position over a portion of surface 46 with mounting receptacles 28 and electronic couplings 34 positioned therein. Bezel 54 can further define second portions 56 of tracks 16 adjacent lateral edges of opening 14 and positionable over first portions 42 the respective tracks 16. As further shown in FIG. 7, second portions 56 of tracks 16, as defined on bezel 54, can comprise areas of inner surface 58 of bezel 54 that overlie first portions 42 of tracks 16, without further modifications thereto. In such an arrangement, door 20 can be oversized with respect to opening 14, at least in lateral directions 60 such that, when bezel 54 is assembled with face plate 44, lateral portions of door 20 are captured between first portions 42 and second portions 56 of tracks 16, thereby slidably coupling door 20 with mounting unit 24 and accordingly, with seatback 12.

Figure 6:
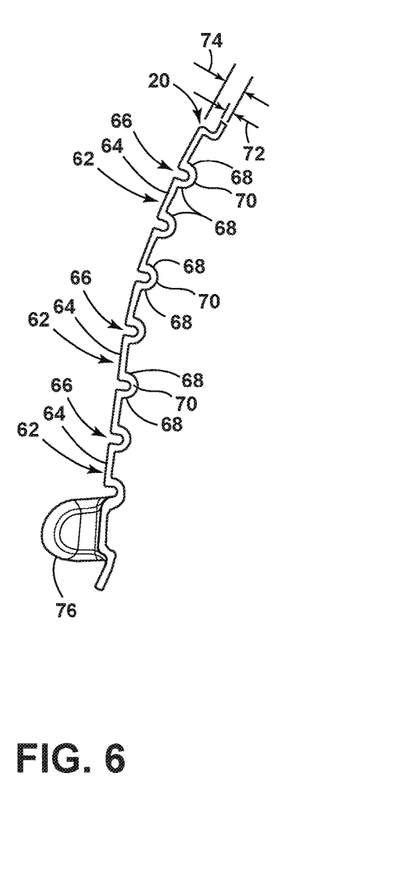
FIG. 6 is a side view of the flexible door from the seatback of FIG. 1.

Turning now to FIG. 6, the single piece body 22 of door 20 includes a structure suited for the aforementioned flexing thereof to accommodate motion of door 20 along track 16, as described above. Such structure includes the general shape of body 22, which has a generally serpentine flow profile defining a plurality of crests 62, which extend along generally planar surfaces 64, and which are spaced apart along door 20 in the vertical direction 38. Crests 62 extend in the lateral direction 60 along door 20 (as shown in FIG. 1) the incorporation of generally planar surfaces 64 along crests 62 help door 20 take on a generally planar appearance when in the closed position (FIG. 1). It is noted that the description of door 20 (as well as opening 14) as being generally planar may include an allowance for a slight curvature (either convex or concave), but having a large enough radius to appear generally flat, particularly when compared to the arc portion 18 of track 16.

The crests 62 of body 22 can be joined together and separated from each other by a corresponding plurality of troughs 66 that are coupled between respective pairs of adjacent crests 62. As shown in FIG. 6, the respective troughs 66 are joined with planar surfaces 64 at extension portions 68 thereof, such that each crest 62 includes two extension portions 68 extending away therefrom on opposite sides thereof. Adjacent extension portions 68 are joined together by arcuate apexes 70 such that the respective troughs 66 include adjacent extension portions 68 and apexes 70. Door 20, as described herein, is made up of a single material allowing it to be manufactured using a single gate, single action injection mold, as opposed to the more expensive, dual-shot edge-gated molds that may be used for other compartment doors. Further, the above-described structure can allow for a low profile, in turn allowing a lower volume for the incorporation thereof, which can result in relatively thin tracks 16 for supporting door 20. As shown in FIG. 6, door 20 can be manufactured with a bend therein in the direction of travel (which is generally in vertical direction 38 in the example illustrated herein) such that a likelihood of bending in lateral direction 60 may be reduced, without adding material thickness.

Door 20 can be of a single, generally flexible material such as polypropylene, or the like. Further, door 20 can be of a generally uniform thickness 72 of between about 0.75 mm and 2 mm, and in one embodiment about 1 mm. The serpentine structure of door 20 can be such that body 22 thereof has a total thickness 74 of between about 2 mm and 4 mm and in one embodiment about 3 mm. Such properties can be modified in order to achieve a desired level of planarity of door 20 during use, and to provide necessary support, given the dimensions of door 20 and the particular shape of any arc or curve portions of the associated track 16, as discussed further below. The generally flexible nature of the material used for door 20, as well as the serpentine shape thereof can allow for the above-noted flexibility of door 20. Such flexibility can include expansion and contraction of troughs 66, depending on the direction of bending desired for door 20. Further, portions of crests 62 can also flex during bending of door 20. The above-noted bent shape of door 20 when unassembled with track 16, can be molded into the shape of door 20, or can imparted on door 20 after having been molded in a generally flat shape, such as by applying heat to body 22 of door 20 and bending to a desired amount, while body 22 cools.

Further, door 20 can include a handle 76 formed therein, such as by extension of one of crests 62. Such a handle can extend beyond adjacent crests 62 and, further beyond a portion of bezel 54 so that handle 76 can be used by an occupant of the vehicle associated with seat 10 to move door 20 between the open and closed positions. For purposes of this disclosure, the presence of such a handle 76 does not affect what is referred to as the overall thickness 74 of body 22 of door 20, as described above.

Figure 5:
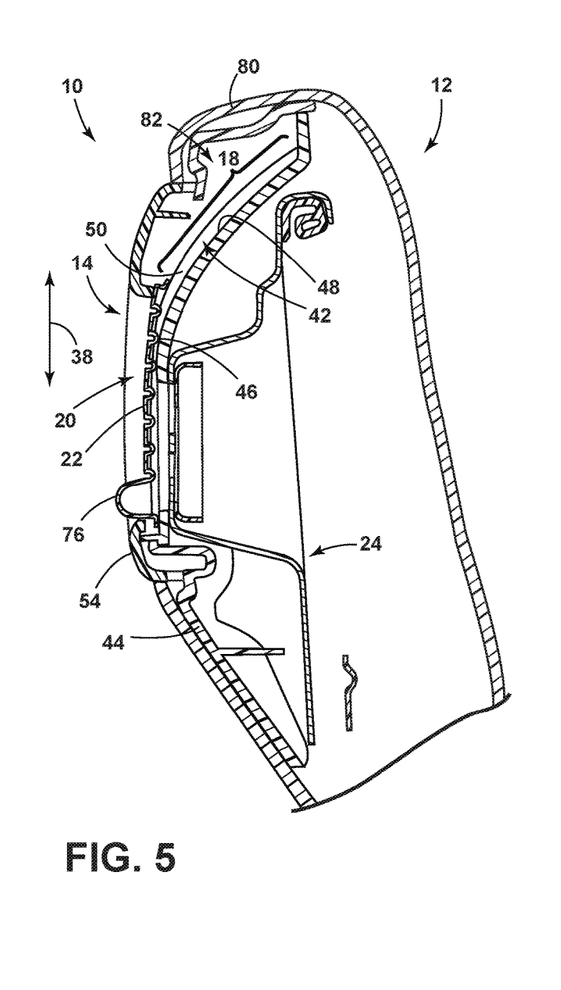
FIG. 5 is a cross section of the vehicle seatback of FIG. 1 taken along line V-V.
Figure 7:
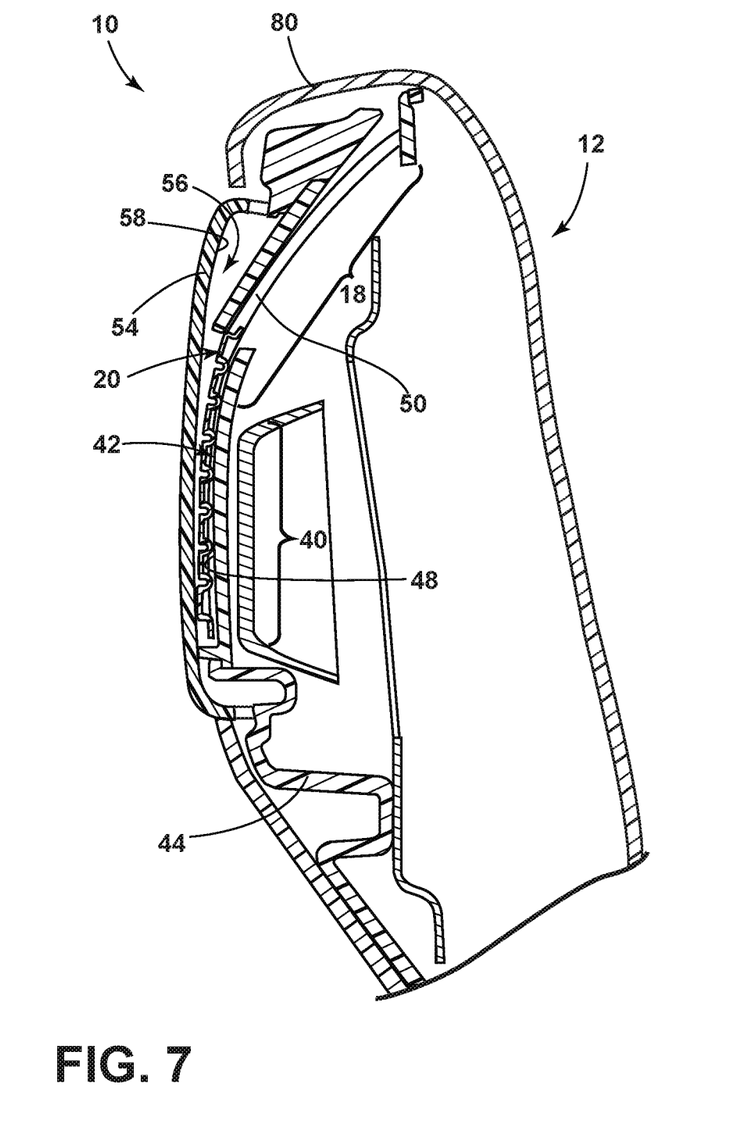
FIG. 7 is a cross section of the vehicle seatback of FIG. 1, taken along line VII-VII.
Figure 8:
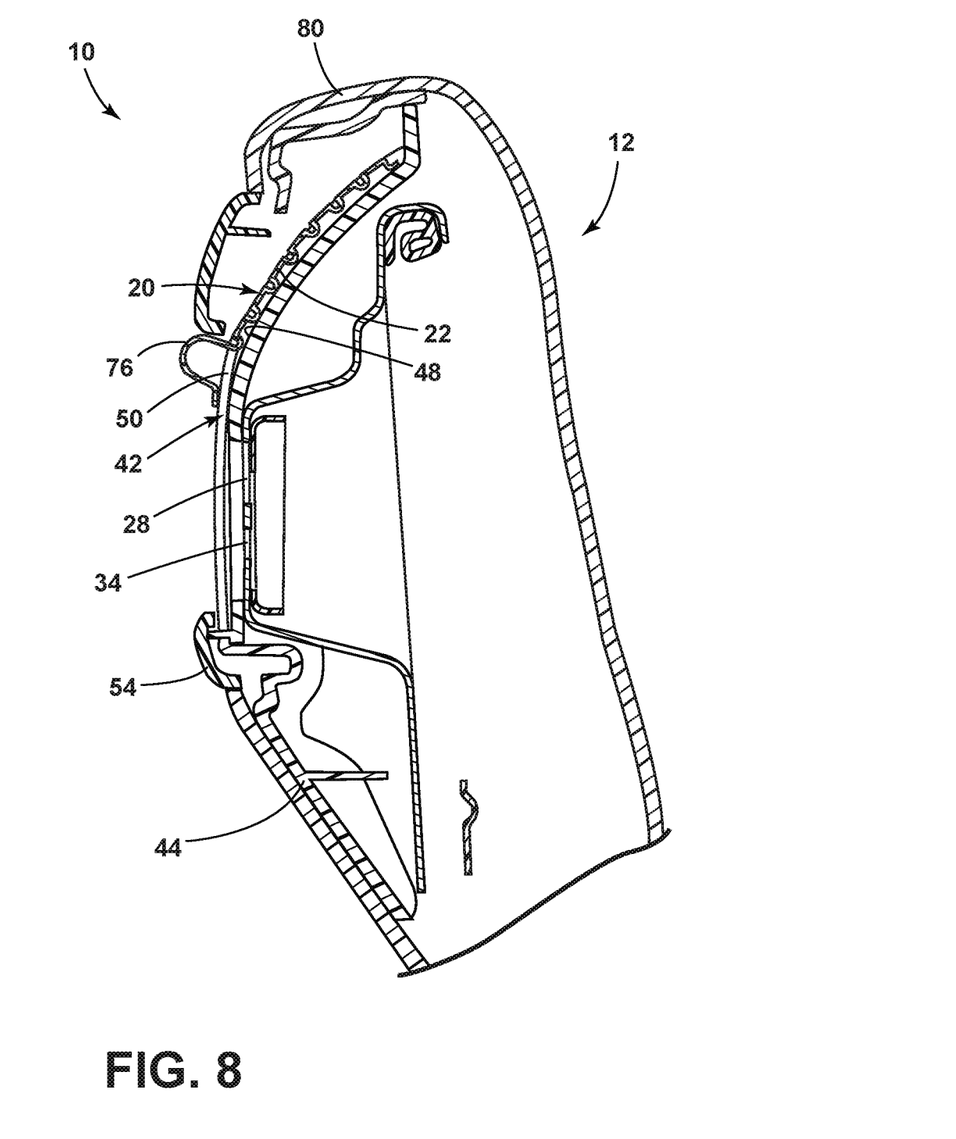
FIG. 8 is a cross section of the vehicle seatback of FIG. 4, taken along line VIII-VIII.

As shown in the cross-sectional views of FIGS. 5, 7, and 8, further aspects of both track 16 and the motion of door 20 therealong are described. As shown in FIGS. 5 and 6, the imperfect arc of track 16 can be generally defined by surface 46 of first portion 42 of track 16, and can include a portion thereof that extends within generally straight portion 40, as well as in a portion thereof that extends within arc portion 18 of track 16. Arc portion 18 may be an imperfect arc, which can include a shape according to a curvature, such as a spline or the like, or from a multiple radius curvature, or the like. As shown in FIG. 7, second portion 56 of track 16 may extend generally along a length of first portion 42, such as that within straight portion 40 within track 16. Accordingly, track 16 may include a third guide portion 78 that is discontinuous from second portion 56. Third guide portion 78 may be included in an additional component of mounting unit 24, or may be a part of face plate 44. In general, third guide portion 78 can be positioned relative to second guide portion 56 to urge door 20 along the imperfect arc, as generally defined by first portion 42 of track 16.

The incorporation of arc portion 18 into track 16 may both help door 20 to extend behind bezel 54 when in the open position (shown in FIGS. 4 and 8) as well as to reduce the height of door 20 in the vertical direction 38 when in the open position. Such a height reduction can allow for opening 14 to be positioned along seatback 12 closer to top 80 of seatback 12 than would otherwise be possible. As shown in FIG. 8, when in the open position door 20 extends into a cavity 82 within seatback 12 that can have a height in vertical direction 38 of less than the height of door 20 when in the closed position (as shown in FIGS. 5 and 6). As further illustrated in FIGS. 5, 7, and 8, door 20 can be generally planar or relative more planar when in the closed position (FIG. 5), and can be generally bent, or relatively more bent, when in the open position (FIG. 8). Such bending can be beneficial for the above-described packaging considerations, and can be achieved by the arced configuration of track 16.

In a further example, a variation of door 20 can be incorporated into an opening that is similar to opening 14, but is associated with a vehicle compartment that includes a recessed cavity adjacent opening 14, such that door 20 can be opened and closed to alternately conceal such a cavity, when closed, and to allow access to such a cavity, when opened. In such an example, a portion of track 16, similar to second portion 56, described above, can be included on a bezel similar to bezel 54, or another such interior vehicle feature. Such a bezel or interior feature can include an additional portion of track 16, similar to first portion 42 of track 16, formed on a structure incorporated into or coupled with the structure of the associated compartment. A cavity similar to cavity 82, described above, can be incorporated into the structure of the vehicle interior adjacent to such a compartment such that door 20 can be stored therein when in the open position. The imperfect arc defined by a track 16 associated with such a structure can be arced to a greater, or lesser degree than what is shown associated with seatback 12, depending on the particular needs dictated by the adjacent structures.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. A door assembly for a vehicle interior opening, comprising:
   a bezel defining an opening, the bezel being coupled on a face plate of a mounting unit including a mounting receptacle on a surface of the face plate;
   a track extending in an imperfect arc; and
   a door supported by the track and slidable therealong through the imperfect arc, wherein the door comprises a single piece, flexible body, including a plurality of crests defining generally planar surfaces extending parallel to each other in a lateral direction, the crests being joined together by respective ones of a plurality of troughs coupled therebetween;
   wherein an open position of the door is such that a portion of the face plate, including the mounting receptacle, is uncovered by the door and a closed position of the door is such that the face plate is covered by the door.

2. The door assembly of claim 1, wherein the troughs extend away and opposite from the respective ones of the generally planar surfaces of the crests to apexes between adjacent ones of the crests.

3. The door assembly of claim 1, wherein the door is slidable along the imperfect arc by flexing of the body.

4. The door assembly of claim 1, wherein the single piece, flexible body is flexible by expansion and contraction of the troughs.

5. The door assembly of claim 1, wherein the bezel further defines a first portion of the track.

6. The door assembly of claim 1, wherein:
   the single piece, flexible body has a thickness of about 1 mm and the door has a thickness between one of the generally planar surfaces and an apex of one of the respective troughs opposite therefrom, the thickness of the door being between about 2.5 and 3.5 mm; and
   the thickness of the door is about 3 mm.

7. The door assembly of claim 1, wherein:
   the track is a first track, the door assembly further including a second track adjacent the opening; and
   the first and second tracks are on laterally opposing sides of the opening, each of the first and second tracks extending in a primarily vertical direction along the imperfect arc.

8. The door assembly of claim 1, further including a mounting unit positioned at least partially within the opening, the mounting unit including a mounting receptacle and a power coupling therein, the mounting unit being alternately concealed and exposed by positioning the door respectively in the closed position and the open position.

9. The door assembly of claim 1, wherein the single piece, flexible body is flexible by expansion and contraction of the troughs.

10. The door assembly of claim 1, wherein the track includes a plurality of discontinuous guide portions, the imperfect arc being partially defined by the guide portions.

11. The door assembly of claim 1, wherein the single piece, flexible body has a thickness of about 1 mm and the door has a thickness between one of the generally planar surfaces and an apex of one of the respective troughs opposite therefrom, the thickness of the door being between about 2.5 and 3.5 mm.

12. The door assembly of claim 11, wherein the thickness of the door is about 3 mm.

13. The door assembly of claim 11, wherein the track includes a plurality of discontinuous guide portions, the imperfect arc being partially defined by the guide portions.

14. A door assembly for a vehicle interior opening, comprising:
   a bezel defining an opening;
   a track extending in an imperfect arc;
   a door supported by the track and slidable along the track between an open position and a closed position relative to the opening, including through the imperfect arc, wherein the door comprises a single piece, flexible body, including a plurality of crests defining generally planar surfaces extending parallel to each other in a lateral direction, the crests being joined together by respective ones of a plurality of troughs coupled therebetween;
   a mounting unit positioned at least partially within the opening, the mounting unit including a mounting receptacle and a power coupling therein, the mounting unit being alternately concealed and exposed by positioning the door respectively in the closed position and the open position.

15. The door assembly of claim 14, wherein the door is slidable along the imperfect arc by flexing of the body.

16. The door assembly of claim 14, wherein the bezel further defines a first portion of the track.

17. The door assembly of claim 14, wherein:
   the bezel is coupled on a face plate of the mounting unit;
   the mounting receptacle is positioned on a surface of the face plate; and
   the open position of the door is such that a portion of the face plate, including the mounting receptacle, is uncovered by the door and the closed position of the door is such that the face plate is covered by the door.

18. The door assembly of claim 14, wherein:
   the track is a first track, the door assembly further including a second track adjacent the opening; and
   the first and second tracks are on laterally opposing sides of the opening, each of the first and second tracks extending in a primarily vertical direction along the imperfect arc.

19. The door assembly of claim 14, wherein the troughs extend away and opposite from the respective ones of the generally planar surfaces of the crests to apexes between adjacent ones of the crests.

* * * * *